US012723488B2

(12) United States Patent
Stenshorne

(10) Patent No.: US 12,723,488 B2
(45) Date of Patent: Sep. 1, 2026

(54) ARRANGEMENT FOR PREVENTING COLLECTION OF DEBRIS AND CUTTINGS ON THE TOP OF A RISER CLOSURE DEVICE

(71) Applicant: Enhanced Drilling AS, Straume (NO)

(72) Inventor: Per Christian Stenshorne, Oslo (NO)

(73) Assignee: Enhanced Drilling AS, Straume (NO)

( * ) Notice: Subject to any disclaimer, the term of this patent is extended or adjusted under 35 U.S.C. 154(b) by 0 days.

(21) Appl. No.: 18/723,749

(22) PCT Filed: Jan. 26, 2023

(86) PCT No.: PCT/NO2023/050022

§ 371 (c)(1),
(2) Date: Jun. 24, 2024

(87) PCT Pub. No.: WO2023/149804

PCT Pub. Date: Aug. 10, 2023

(65) Prior Publication Data

US 2025/0052132 A1 Feb. 13, 2025

(30) Foreign Application Priority Data

Feb. 1, 2022 (NO) .................................. 20220152

(51) Int. Cl.

*E21B 37/00* (2006.01)
*B08B 9/032* (2006.01)
*E21B 17/01* (2006.01)

(52) U.S. Cl.

CPC ............ *E21B 37/00* (2013.01); *B08B 9/0321* (2013.01); *E21B 17/01* (2013.01); *B08B 2209/032* (2013.01)

(58) Field of Classification Search

CPC .......... E21B 37/00; E21B 17/01; E21B 29/12; E21B 21/01; B01B 9/321; B01B 2209/32

(Continued)

(56) References Cited

U.S. PATENT DOCUMENTS 3,500,907 A * 3/1970 Gentry .................. E21B 33/076 166/70
4,029,160 A * 6/1977 Leidvik .................. B28D 1/041 175/212

(Continued)

FOREIGN PATENT DOCUMENTS

WO WO-2017115344 A2 7/2017
WO WO-2021086200 A1 5/2021

OTHER PUBLICATIONS

Patent Cooperation Treaty, International Application No. PCT/NO2023/050022, "International Search Report," Apr. 20, 2023, 4 pages.

*Primary Examiner* — Nicole Coy
*Assistant Examiner* — Douglas S Wood
(74) *Attorney, Agent, or Firm* — Bradley Arant Boult Cummings LLP

(57) ABSTRACT

An arrangement and a method for preventing collection of debris on or for removing debris, such as cuttings, from the top of a closed riser sealing device (215) in a subsea riser (1). The arrangement comprises a flushing line and at least one flushing fluid inlet (294) to direct a jet of flushing fluid into said riser (1). The inlet (294) directs flushing fluid into a space in the riser (1) immediately above said closing element. The invention also relates to a swirl element (351) located immediately above the riser sealing device (215) and being rotationally coupled to a drillstring (11).

18 Claims, 7 Drawing Sheets

(58) Field of Classification Search
USPC .......................................................... 166/367
See application file for complete search history.

(56) References Cited

U.S. PATENT DOCUMENTS

| | | | | |
|---|---|---|---|---|
| 4,060,140 | A * | 11/1977 | Barrington | E21B 7/128 175/312 |
| 5,839,511 | A * | 11/1998 | Williams | E21B 37/00 166/312 |
| 6,263,981 | B1 * | 7/2001 | Gonzalez | E21B 21/065 175/324 |
| 6,453,996 | B1 * | 9/2002 | Carmichael | E21B 37/00 166/222 |
| 8,403,059 | B2 | 3/2013 | Hughes et al. | |
| 9,169,714 | B2 * | 10/2015 | Edwards | E21B 33/076 |
| 11,891,861 | B2 * | 2/2024 | Stenshorne | E21B 17/01 |
| 12,209,471 | B2 * | 1/2025 | Haugland | E21B 33/072 |
| 2001/0018967 | A1 * | 9/2001 | Uead | H01L 23/427 257/722 |
| 2001/0018976 | A1 * | 9/2001 | Carmichael | E21B 21/103 166/334.4 |
| 2007/0017679 | A1 * | 1/2007 | Wolf | E21B 23/006 166/174 |
| 2008/0017384 | A1 * | 1/2008 | Anderson | E21B 33/035 166/347 |
| 2011/0214871 | A1 * | 9/2011 | Leduc | E21B 33/085 166/311 |
| 2012/0080186 | A1 * | 4/2012 | Reed | E21B 21/001 175/102 |
| 2014/0096972 | A1 | 4/2014 | Leiper et al. | |
| 2014/0262315 | A1 * | 9/2014 | Boisjolie | E21B 17/07 166/367 |
| 2018/0038177 | A1 * | 2/2018 | Leuchtenberg | E21B 21/08 |
| 2021/0213490 | A1 | 7/2021 | Mackenzie et al. | |

* cited by examiner

ARRANGEMENT FOR PREVENTING COLLECTION OF DEBRIS AND CUTTINGS ON THE TOP OF A RISER CLOSURE DEVICE

TECHNICAL FIELD

The present invention relates to an arrangement for preventing collection of debris and cuttings on the top of a riser closure device in a subsea riser.

BACKGROUND ART

From time to time a riser is operated with a riser sealing device (RSD) such as a rotating control device (RCD) at a position in the riser. This may be for a short time or for a prolonged period of time. Among the situations when an RCD is required are ECD-C and CML+ operations, such as those described in WO 2021/086200.

WO2021/086200 mentions flushing of the area above the closing element in very general terms. In this arrangement there is no need of a sophisticated flushing arrangement, as a riser insert is mounted above the rotating sealing device (RSD) and also above the tie in line. The tie in line is used for flushing the cavity between the RSD and the riser insert. The intention is to prevent particles from entering the space between the riser insert and the RSD.

Unless there are any defects in the arrangement, the mud above the RSD is practically free from particles. Mud originating from the borehole is circulated into the riser above the insert. The mud will enter the riser above the insert and clean fluid entering the riser below the insert will prevent particles from entering the cavity through the insert by creating an upward flow through the insert.

The entering of the fluid through the boost line is a mere inflow of fresh fluid into the space above the RSD. The flushing is not directed to the upper surface of the RSD. It is described how debris is prevented from entering the space between the insert and the RSD, not that debris that may have already entered is removed from the space.

If there are cuttings or other debris present in the riser above the RSD, these cuttings and debris may collect on top of the RSD. This may be due to fluids, such as mud, entering the riser above the closed element, the fluids having debris entrained therein.

The debris thus collected on top of the RSD may cause operational troubles for several reasons. Some of these are listed in the following. It may contain particles that are small enough to enter into small spaces within the RSD, which could be detrimental to RSD operability and its ability to hold differential pressure. Also, as the RSD and the drillpipe are rotating, the accumulated debris could start wearing away on the riser wall. When the RSD is to be retrieved, the debris could be packed so hard on top of the RSD that it is not possible to retrieve the RSD.

The debris collection challenge is particularly present in a version of pumped riser technology where the mud returns with cuttings are pumped back into the riser above the RSD and returned to surface through the riser, rather than through a separate mud return line as in traditional pumped riser solutions.

Prior art solutions have attempted to avoid this collection of debris by installing debris traps that will receive falling particles and contain them so that they do not fall onto the closing element. An example of such a trap is shown in U.S. Pat. No. 4,060,140. Such traps may, however, be a hindrance to operations in the well and it may sometime be necessary to remove them from the riser before performing certain operations.

U.S. Pat. No. 8,403,059 also shows a sealing assembly that will function as a debris trap, although that function is not specifically stated.

WO2017/115344 show sealing elements and a booster line coupled to the riser above the sealing elements. However, there is no indication in the description of this booster line being used for flushing cuttings from the top of the sealing element.

U.S. Pat. No. 5,839,511 defines a sub to be incorporated in a drillstring having fins or brushes. A plurality of nozzles is arranged close to the fins. No closed sealing element is shown.

The purpose of the solution of WO2017/115344 is to use the hydraulic power of the fluid coming from the drillstring to flush particles upwards and away from the (open) BOP and then pump them up. The tool is a sub located on a drillstring. This means that the swirl element will have to be attached to the drillstring whenever cleaning of the wellbore is desired. It will then be lowered through the wellbore/riser to the BOP. Here it will be employed for the time needed to clean out the debris. After the cleaning has been completed, the drill string and tool will be pulled out of the wellbore again to remove the tool from the drillstring. Between each time the tool is used, debris will be allowed to accumulate in crevices in the BOP. Hence, the tool has to be used regularly, which involves pulling the drillstring, attaching the tool, lowering the drillstring, rotating and flushing with the tool, pulling the drillstring again, disconnecting the tool and inserting the drill string to continue normal operation.

US2014/0096972 is not concerned with removing particles on top of a sealing device. It is similar to WO2017/115344 and describes a sub having a set of fins equipped with magnets. There are nozzles between the fins to obtain motion of the fluid around the sub. Magnetic particles are picked up by the magnets.

Consequently, the liquid motion is not used to convey the particles to the surface. As the nozzles are arranged on a sub that travels with the drill string it will be situated at a location where debris may collect only for a short period of time.

US2021/0213490 also describes a device that will travel with the string, in this case a coiled tubing.

SUMMARY OF INVENTION

The present invention has as an objective to prevent debris, such as cuttings from collecting on top of a closed riser sealing device (RSD) in a detrimental degree and ensure that debris that enters the riser is returned to surface The present invention also has as an objective to facilitate removal of any accumulated debris from the top of the RSD.

These objectives are in a first aspect of the invention met by a novel flushing arrangement, by which a fluid can be injected as a jet into the space in the riser immediately above an RSD.

The objectives are in the first aspect also met by a novel method by which a jet of fluid is injected as a jet into the volume of the riser immediately above an RSD.

By "immediately above an RSD" is meant at a distance short enough above the RSD that the flushing fluid entering the riser causes the debris that has collected on the top of the RSD to be set in motion.

In a second aspect of the invention, the objectives are met by a swirl element that is rotationally coupled to the drillstring so that it rotates with the drillstring but may slide along the drillstring as the drillstring moves along the wellbore, so that the fluid immediately above the RSD is set into a rotating motion that stir up any debris.

The swirl element may be rotationally coupled directly to the drillstring or it may be coupled to the drillstring through a rotating element in the closing element, which in turn is rotationally coupled to the drillstring.

In the second aspect the objectives are met by a novel method by which a swirl element that causes an agitation of the fluids immediately above the RSD.

The main purpose of the invention, in its different manifestations, is to create a swirling fluid motion in the entire 360 degrees around the drillpipe inside the riser in the region just above the RSD, that creates sufficient fluid motion to set any debris in motion in order to lift particles off the surface of the RSD and to keep particles in suspension in the liquid, thus preventing them from accumulating on top of the RSD.

DETAILED DESCRIPTION OF THE INVENTION

Figure 1:
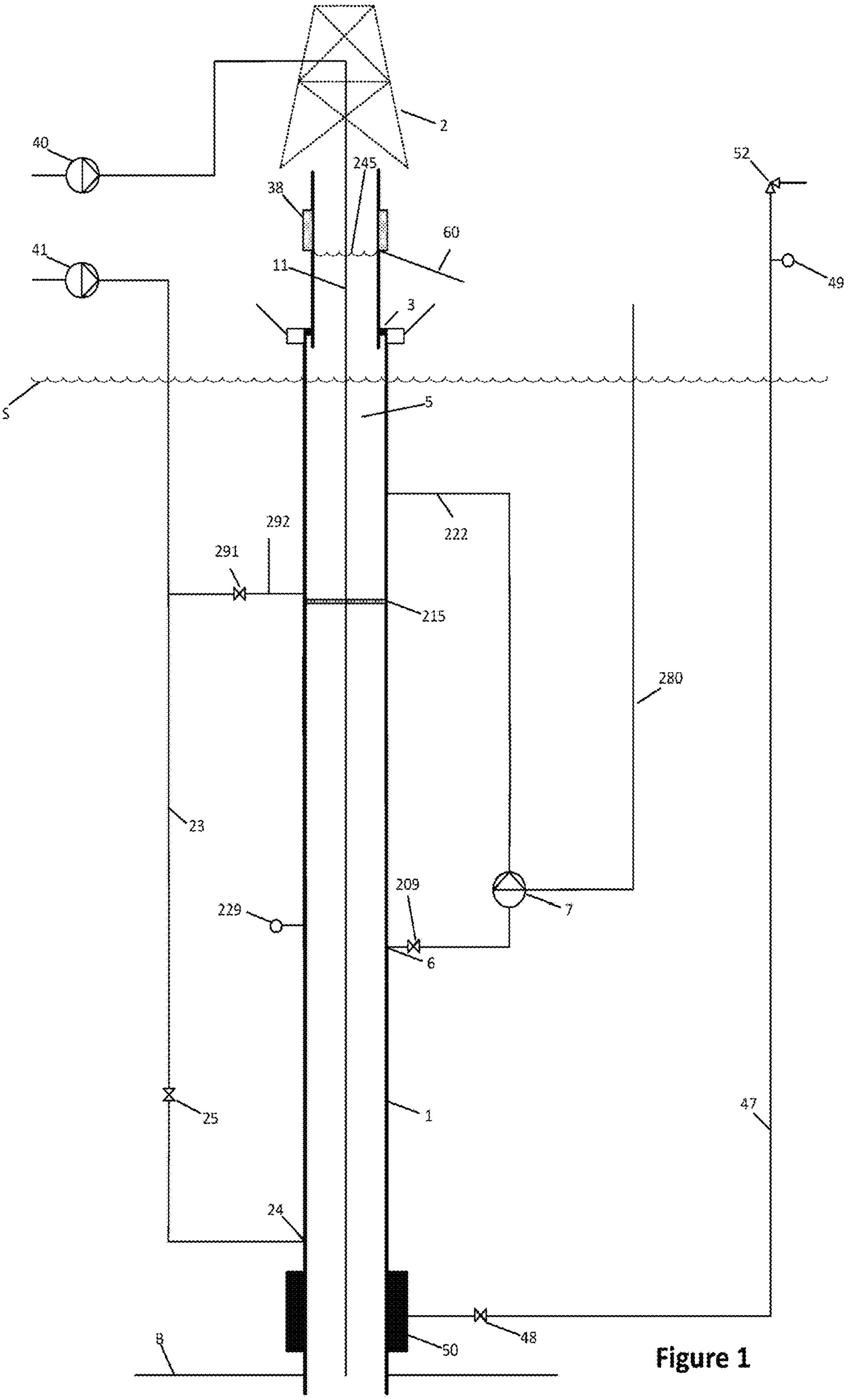
FIG. 1 shows a per se prior art riser arrangement but to which a novel flushing line has been added.

FIG. 1 shows a riser arrangement having a drilling riser 1 extending from a drilling platform or vessel 2 at a surface S of a body of water to a bottom B of the body of water. The drilling riser 1 contains a slip joint 3 that is adapted to take up relative movement between the drilling platform or vessel 2 and the riser 1.

A drill string 11 extends along the inside of the drilling riser 1 and into the well (not shown). An annulus 5 is formed between the drill string 11 and the riser 1.

A drilling liquid, also called mud, is pumped down the drill string 11, out the lower end of the drill string 11 and up the annulus 5. After the mud has exited from the lower end of the drill string 11, it will become mixed with the content of the well, such as oil, gas, water, particles, rocks etc. and flow up the annulus 5. The mud is pumped down the drill string 11 by a rig pump (usually a set of pumps) 40.

A choke line 47 extends from a BOP 50. The choke line 47 has an isolation valve 48 and a pressure sensor 49. The choke line 47 is coupled to a rig choke 52.

A boost line 23 is coupled between an inlet 24 that is arranged close to the BOP 50. The boost line 23 has isolation valves 25 and is supplied by a boost pump 41.

A riser sealing device (RSD) 215, which may be a rotating control device (RCD), is arranged at a position in the riser below the surface and above the BOP 50. The RSD 215 may seal around the drill string 11. The RSD 215 may also be of a type that seals the riser when the drill string is not present.

Below the RSD 215 there is an outlet 6 from the riser 1. The outlet is coupled to a mud pump line 222 with an isolation valve 209. The mud pump line 222 extends via a subsea pump 7 to an inlet into the riser 1 above the closing element. An umbilical 80 provides power and control signals to the pump 7.

At the top of the riser 1 there is a mud flowline 60 and an annular sealing element 38. The riser is normally operated with a full riser level 245. The annular sealing element 38 is used to close the riser annulus 5 if gas should rise to the top of the riser 1. There is a separate system (not shown) that ensures that the gas is handled in a safe manner when the annular sealing element 38 is used. This is often referred to as the diverter system. The flowline 60 is used to route mud back to a mud treatment facility during conventional drilling operations.

At a position between the top of the riser 1 and the outlet 6 there is riser sealing device (RSD), such as a rotary sealing device (RSD) 215. The RSD 215 is able to seal across the annulus 5 of the riser 1 and at the same time allow rotation of the drill string 11.

A flushing line 292 is arranged between the boost line 23 and the riser. The flushing line 292 has an isolation valve 291 that may be remotely controlled. The flushing line 292 enters the riser immediately above the RSD 215, as will be explained further below. The flushing line 292 also preferably enters the riser 1 below the mud pump line 222. A sufficient distance between the inlet from the flushing line and the inlet from the pump ensures that debris from the pump is kept away from the RSD. By selectively opening and closing the boost line isolation valve 25, and the flushing line isolation valve 291, the driller can choose the flow path, and the boost line 23 can be used both as an injection line, and also serve its traditional purpose as a boost line.

It is not per se novel to arrange a branch line between the boost line 23 and the riser 1. This is inter alia known from WO 2021/086200. This branch line can be used as a fill line to fill mud into the riser above the closing element. However, this known fill line enters the riser at a distance above the closing element, while the novel flushing line 292, according to the present invention, enters the riser immediately above the closing element 215. The novel flushing line 292 is, however, arranged in a way that it ensures a fluid-motion within the riser 1, above the RSD 215, such that debris will not settle on top of RSD 215 when flushing line 292 is operated. Certain embodiments ensuring this function will be explained below.

Figure 2:
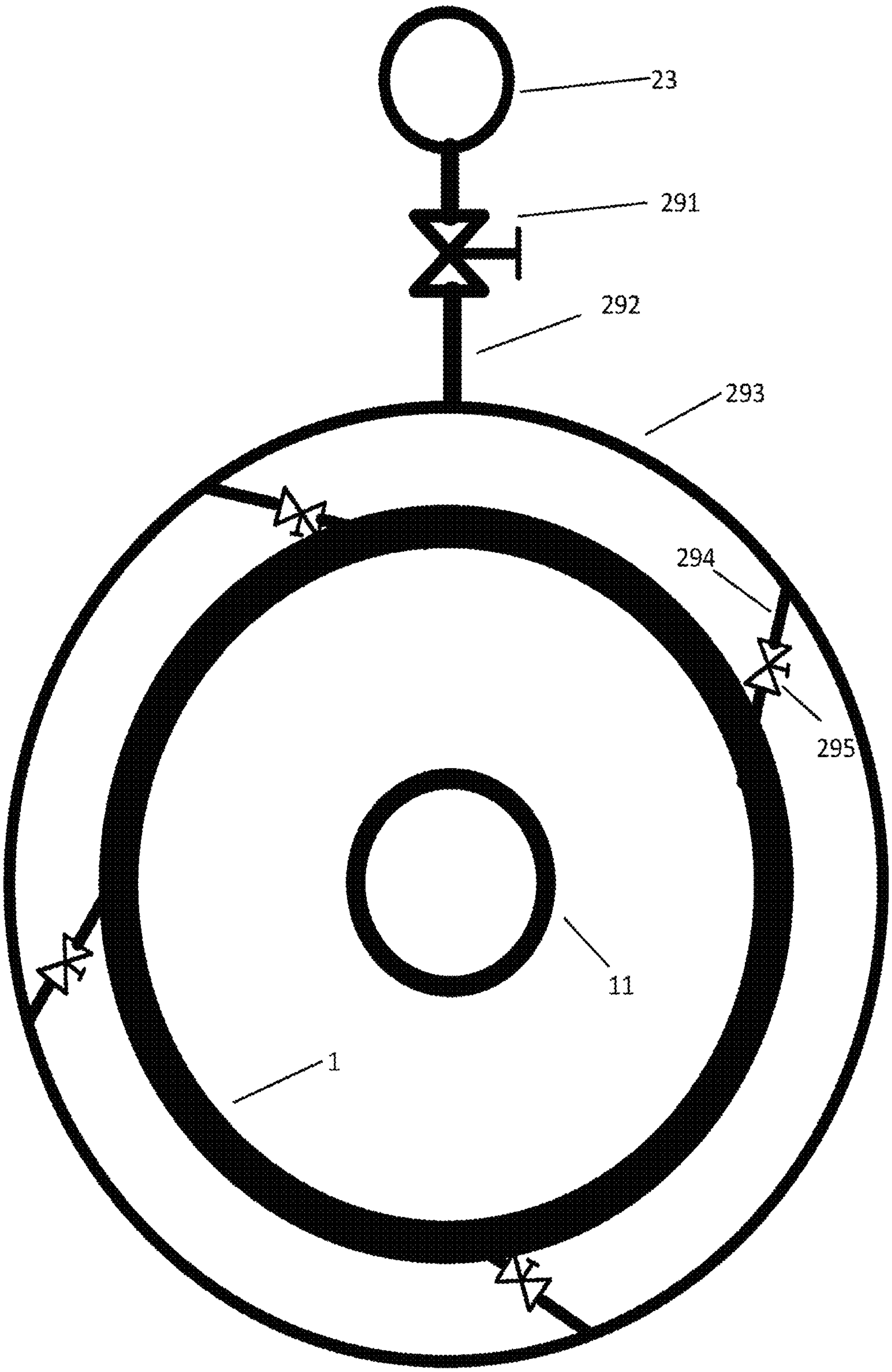
FIG. 2 shows a cross section of a flushing arrangement according to an embodiment of the present invention.

FIG. 2 shows a cross-section of the riser 1 at the location of the flushing line 292. In the figure is shown a cross-section of the boost line 23. From the boost line 23 the flushing line 292 with the isolation valve 291 extend. The flushing line 292 is coupled to a distribution line 293 that extends around the riser 1. From the distribution line 293 a plurality of injection lines 294 extend into inlets in the riser 1.

The injection lines 294 may be arranged at an angle to the riser 1. The inlets to the riser may be equipped with nozzles to increase the speed of fluid entering the riser.

The injection lines 294 may be equipped with isolation valves 295. These isolation valves 295 may be individually controlled to allow for flushing of individual injection lines 294 in case of plugging.

The injection lines are shown extending at an acute angle relative to the circumference of the riser 1. They may also be directed at an angle relative to the longitudinal axis of the riser 1. This angle may conveniently be so that the fluid is directed downwards towards the upper surface of the RSD 215.

The distribution line 293 shown in FIG. 2 extends as a complete ring around the riser 1. However, the distribution line 293 may also extend only partially around the riser 1. The isolation valves 295 may alternatively be placed on the distribution line 293. A further alternative is that a plurality of lines branches off from the flushing line 292 and extends separately to the inlets into the riser 1. In this alternative, the isolation valves 295 would be placed on each of the inlets to riser 1.

The flushing line 292 is conveniently operated intermittently. The valve 291 is opened and a fluid, which may be gas, mud, water, oil, MEG or other convenient and readily available fluids, enters the riser 1 under a suitable pressure. Due to the angling of the injection lines 294, a swirl is created inside the riser 1. This swirl will create motion for any debris and cuttings that are present in the "dead volume" below the mud pump line 222 entry point and the RSD 215. It will also be able to stir up any debris that may have settled on top of the RSD 215, and the debris is carried with the fluid upwards in the riser.

Conveniently, the flushing is done at the same time as there is circulation up the riser by mud that enters the riser 1 through the mud pump line 222. Thereby the debris will be carried up to the surface.

The injection lines 294 may, although less convenient, also extend at a right angle to the riser 1. A single injection line 294 with a single inlet into the riser 1 is also conceivable.

Figure 3:
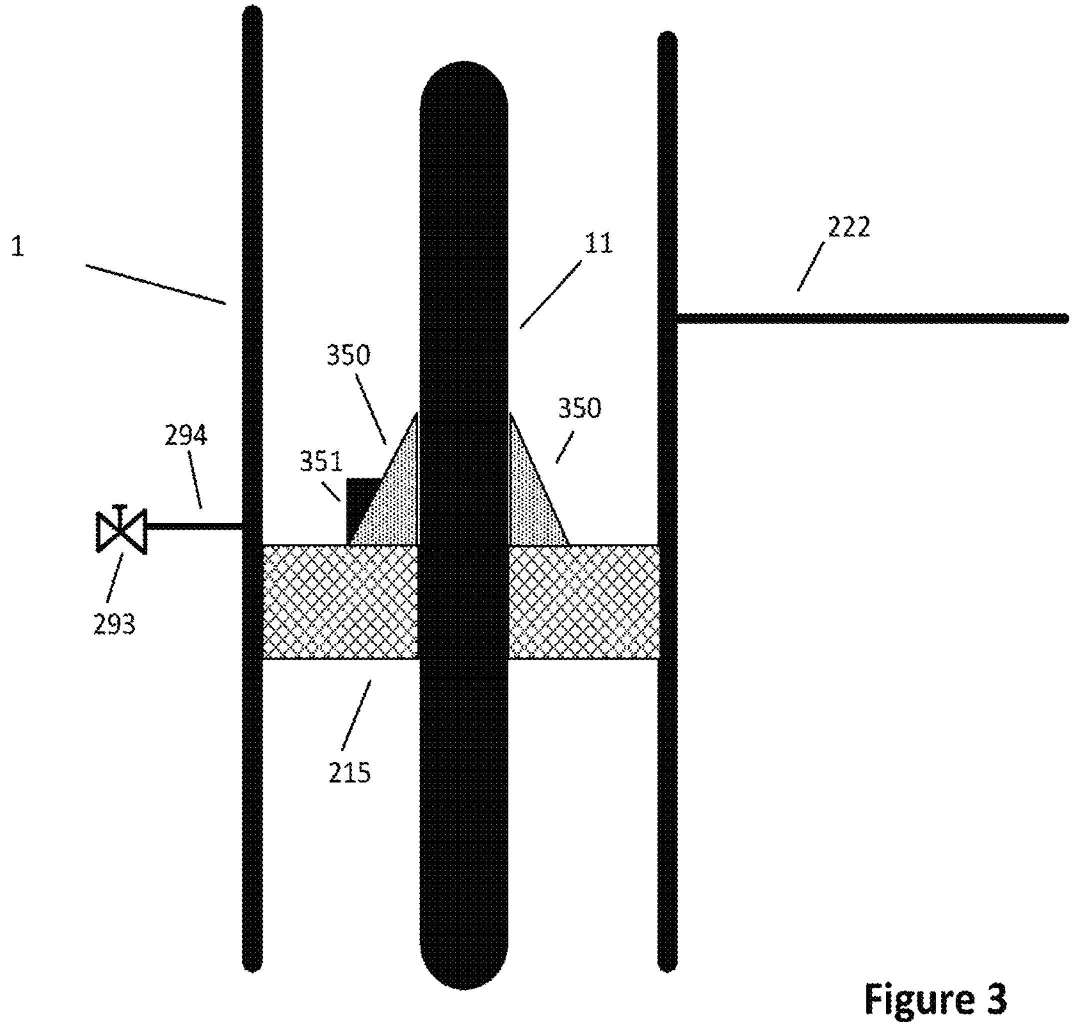
FIG. 3 shows a cross section of a flushing arrangement in combination with a fluid directing device that is positioned in the center of the riser to direct the flow and enable increased circular motion of the fluid.

FIG. 3 shows a cross-section of the riser 1, with the RSD 215 in place. There is an injection line 294, with an isolation valve 293. In the center of the riser 1 is a drill-pipe 11. The injection line 294 is shown perpendicular to the riser 1, but could also be slanted at an angle upwards, downwards, sideways or a combination thereof. On top of the RSD 215 is positioned a fluid directing element 350 that in a preferred embodiment will rotate with the RSD. The drillstring 11 is free to move axially through the fluid directing element 350. The RSD will rotate with the drillstring 11. The fluid directing element 350 is locked to the RSD 315 either by having a weight that prevents it from being lifted by the friction against the drill pipe so that it is held by gravity alone, or by being mechanically attached to the RDS 215, but allowed to rotate, so that it will keep its position on top of the RSD even if the drillstring is moved upward. Alternatively, the element 350 is not attached to the RSD 215 but rotates with friction from the drillpipe 11. This transfer of frictional energy may be either by mechanical contact of a flexible material in the fluid directing element 350, such as rubber part with enough flexibility to allow for variations in the diameter of the drillpipe 11, such on tool-joints, or by hydraulic friction without direct mechanical contact between the element 350 and the drillpipe 11. In the latter version, the fluid directing element 350 could be allowed to rotate at a rotational speed that is lower than that of the drillpipe 11. The element 350 is preferably conical with the widest part facing the RSD. The element may also have other shapes that work to direct the particles towards the periphery of the riser.

The slanted angle of the conical element 350 ensures that any debris coming from above is moved towards the circumference of the riser 1. The element 350 also ensures that the cross-sectional area onto which the fluid is injected through the injection line 294 is reduced, thus giving an increased flow-velocity for any given flow rate through the injection line 294. On the conical element 350 one or more fins 351 may be located. The fins 351 function as a swirl device and utilizes the rotation of the drillpipe to generate a rotational flow on top of the RSD. Instead of fins the swirl device may comprise other types of formations that will create a swirl when rotated. The swirl device may be a separate device from the fluid directing element 350.

FIG. 3 also shows the mud pump line 222 entering at a location well above the RSD and preferably also above the injection line 294. Most of the particles in the mud coming from the mud pump line 222 will naturally move upwards, as there will be a bulk velocity of liquid upwards in the riser. Any solids that fall below the flow-path from the mud pump line 222 and up the riser 1 will have a tendency to remain in the "dead-volume" below, on top of the RSD, unless there is a liquid flow that sets it in motion and carries it upwards.

Figure 4:
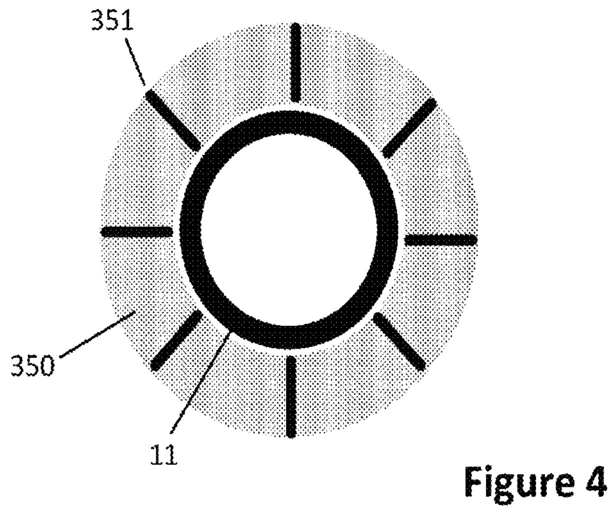
FIG. 4 shows details of an alternative embodiment of the fluid directing device.

FIG. 4 shows the element 350 with fin arrangement 351 described in FIG. 3 seen from above. On the element 350, around the drillpipe 11, there are located one or more fins 351 or other types of protrusions, to create a swirl element. The geometry of the fins 351 will depend on a number of factors, such as wear resistance, resistance to clogging and so on, in addition to ensuring that it creates a circular flow. The element 350 may or may not be in mechanical contact with the drillpipe 11. There may also, similar to the fluid directing element described above, be an elastic material between the element 350 and the drillpipe 11 that allows for the changes in diameter of the drillpipe 11, such as on tool-joints. As for the fluid directing element described above, the swirl element may be held close to the RSD 215 by gravity or by being rotationally attached to the RSD 215.

Figure 5:
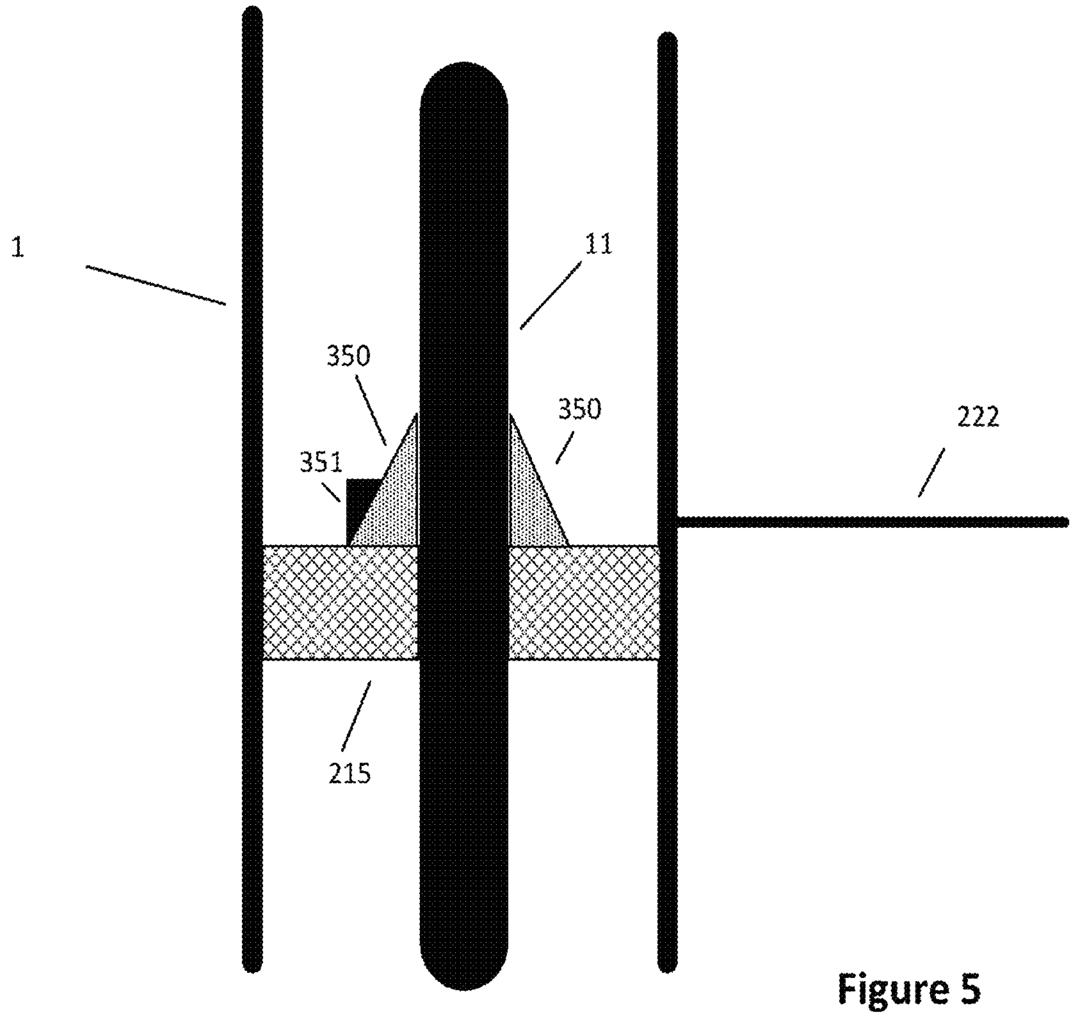
FIG. 5 shows a flushing arrangement where return mud with cuttings enters the riser just above the RSD and a fluid directing device in the center of the riser.

FIG. 5 shows an arrangement where the mud pump line 222 enters the riser 1 just above the RSD 215. In order to ensure sufficient motion of the fluid to keep particles in motion and ensure they are carried upwards by the flow from mud pump line 222, the element 350 and fins 351, as described in FIG. 3 are used. Any particles that enter the riser 1, through the mud pump line 222, but which are not carried upwards towards surface by the flow from mud pump line 222, will enter the "dead-volume" on the opposite side from the inlet from the mud pump line 222. Here the particles will be moved around the riser by the fluid motion created by the element 350 and the fins 351 until the particles meet the flow from the mud pump line 222 and can be carried back to the surface. Without the element 350 and fins 351, there is a potential that there would have been areas on top of the RSD 215, where the flow would be too low to move particles away. Hence, debris may accumulate in those areas.

The location of the mud pump line 222 will be optimized to avoid wear on the RSD 215. There might be a significant distance of up to 2-3 feet (about 1 meter) from the RSD 215 up to the inlet from the mud pump line 222, as the swirling motion created by the rotating element 350 and the fins 351 will create sufficient swirl also in the upwards direction in order to carry particles up to the height of the mud pump line 222.

The inlet of mud pump line 222 may also be arranged with a slanted angle to the riser. This could be a slanted angle axially, i.e. the inlet may be angled perpendicularly, upwards or downwards relative to the axial direction of the riser.

Figure 6A:
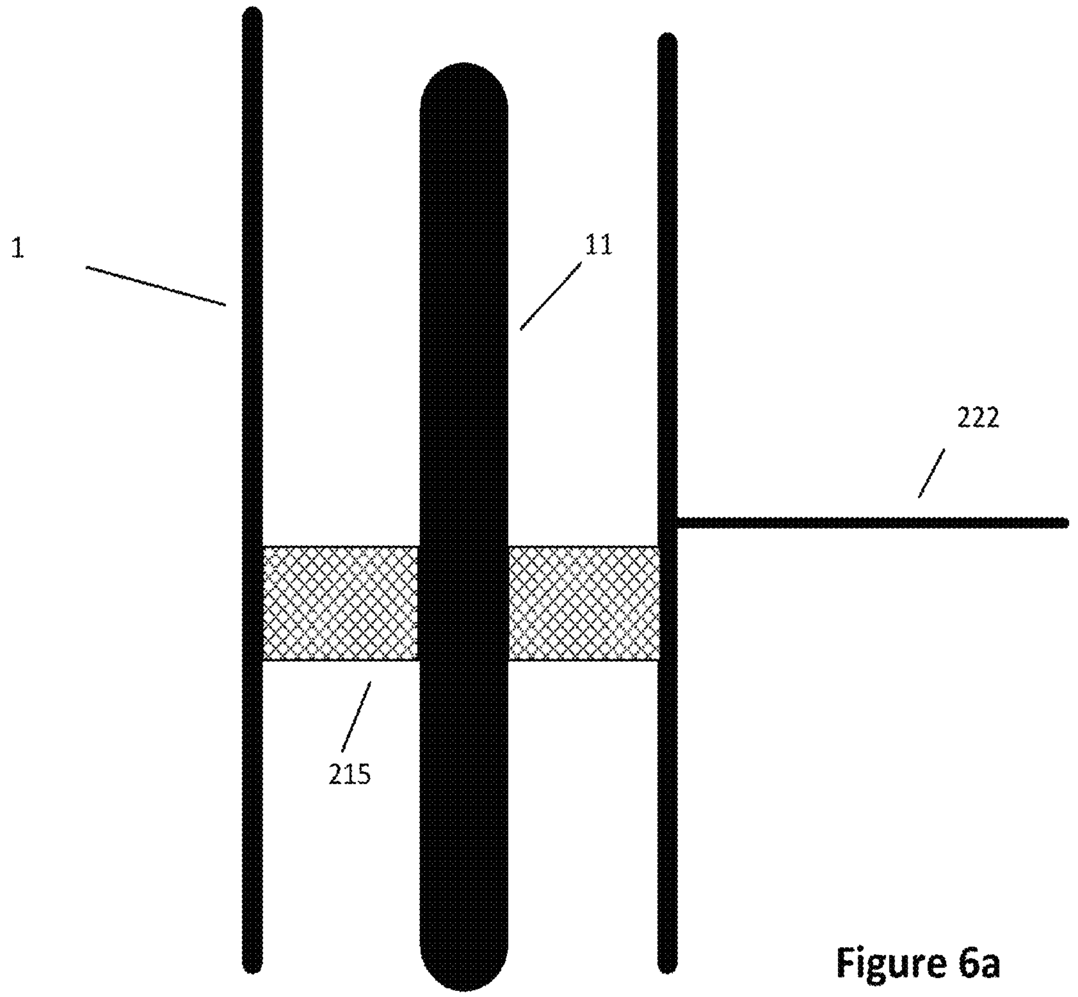
FIG. 6*a* shows, in a longitudinal section, a flushing arrangement where return mud with cuttings enter the riser just above the RSD and the arrangement comprises several inlets with a slanted angle towards the riser so as to create a circular motion of liquid in the riser to prevent cuttings from settling and accumulating.
Figure 6B:
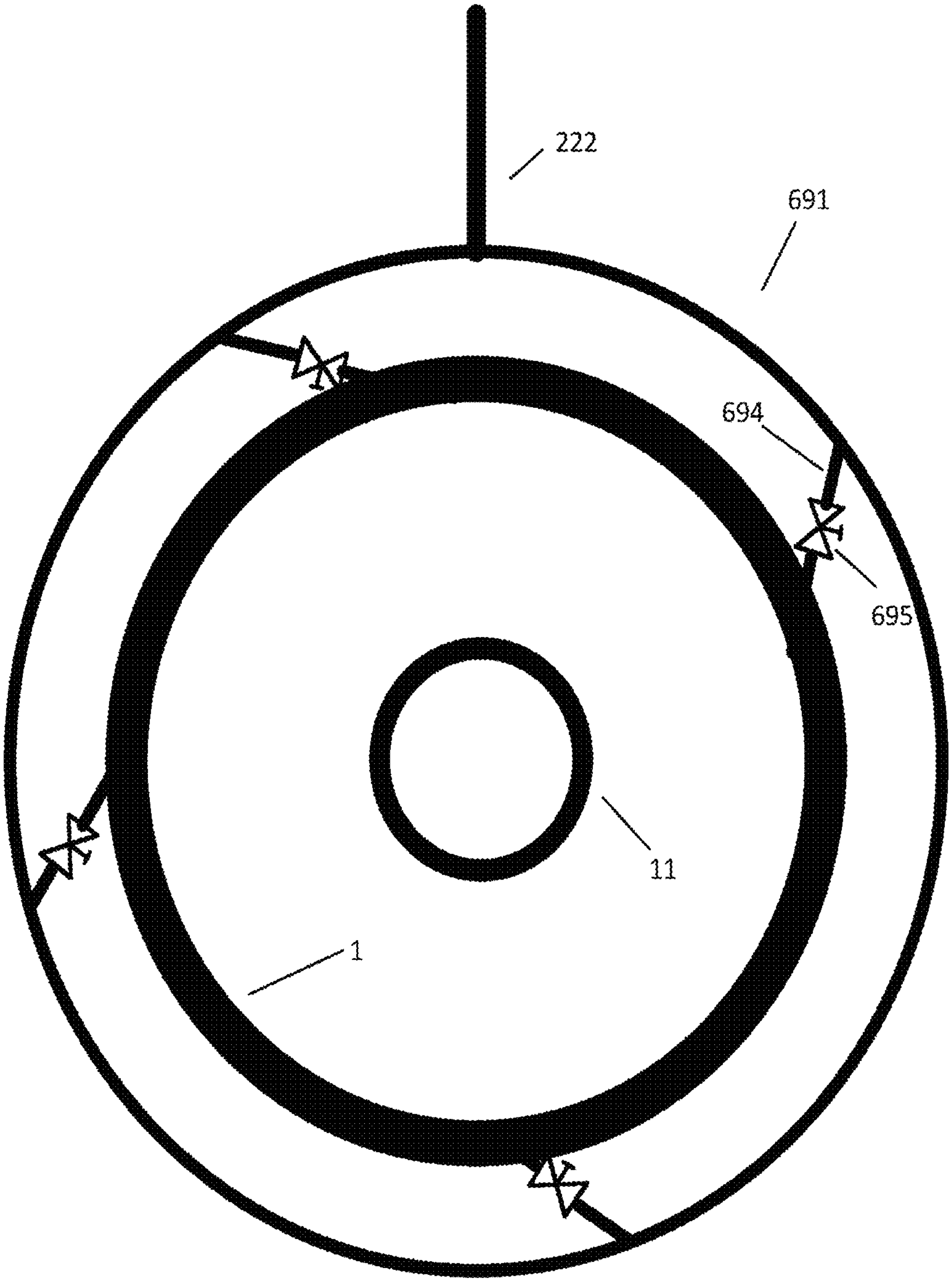
FIG. 6*b* shows the flushing arrangement of FIG. 6*a* in cross section.

FIG. 6*a* shows, in longitudinal section, an arrangement where the mud pump line 222 enters the riser 1 just above the RSD 215. FIG. 6*b* shows, in cross-section, the mud pump line 222 entering a mud pump line distribution line 691, that is coupled to the riser through one or several mud injection lines 695. The injection lines 695 enter the riser at a slanted angle. The mud injection lines 695 may be equipped with an isolation valve 694, that enables the driller to choose which injection lines to use, or to intermittently flush individual lines at high velocities to avoid plugging. However, the mud distribution line 691 may also extend only partially around the riser 1. The isolation valves 695 may also be placed on the mud pump distribution line 691. A further alternative is that a plurality of lines branches off from the mud pump line 222 and extend separately to the inlets into the riser 1. In this alternative, the isolation valves 695 would be placed on each of the riser 1 inlets.

For the aspects of the invention that include the injection line 294, it is foreseen that during operations where the mud returned to surface contains cuttings, the injection line 294 will be in operation. There may, however, be instances where the pumping functionality is not present for a period. This could be because of issues with the equipment, or because the driller desires to use the boost functionality, and hence the boost line is not available for flushing of the riser. During these instances, cuttings and other debris may accumulate on top of the RSD. When the injection line 294 is then put back in operation again, the injected fluid will not only carry any new debris and cuttings back to surface, but it can also be used to wash away cuttings that may have accumulated in the non-operational period.

Since the flushing arrangement is arranged completely on the outside of the riser 1, it will not interfere with any operations in the riser 1. The arrangement is a small addition to the existing structure. The riser 1 must have a special joint that has inlets for the injection lines 294 and an outlet from the boost line 23 must be provided. The inlets into the riser 1 may be formed in the same joint that has been prepared to receive the closing element.

The remaining components are few, small and relatively cheap. They may be installed together with the riser.

The valve functions will typically be controlled by the same control system that controls the subsea pump 7, but it is also foreseeable that they are controlled by a separate control system and umbilical.

If it is desired to be able to position the closing element at various positions in the riser, several flushing arrangements may be arranged on the riser. The isolation valves of each arrangement would they be separately controlled.

Although a flushing line branching off from the boost line is the most convenient, it is also possible to branch off the flushing line from another existing line in the riser arrangement. It is also conceivable to arrange a separate and dedicated flush line from the surface.

It should be noted that the fluid jet injection arrangement and the swirl element may be used separately but that an enhanced effect is obtained when they are used together.

The invention claimed is:

1. An arrangement comprising:

a riser defining a longitudinal bore;

a riser sealing element;

wherein the riser sealing element has a closed position, the closed position either closing the longitudinal bore around a string arranged within the riser or completely sealing the longitudinal bore;

wherein the arrangement is adapted to prevent collection of debris on or for removing debris from the top of the riser sealing element when the riser sealing element is in the closed position;

a flushing line and a plurality of fluid flushing inlets into the longitudinal bore, the plurality of fluid flushing inlets directing a jet of flushing fluid into the longitudinal bore immediately above the closed riser sealing element wherein the flushing line branches off from a boost line extending along the riser; and wherein the plurality of fluid flushing inlets are connected to a distribution line, which distribution line is branched off from the boost line.

2. The arrangement of claim 1, wherein the plurality of fluid flushing inlets directed at an acute angle relative to the circumference of the riser.

3. The arrangement of claim 1, wherein the plurality of fluid flushing inlets for are arranged around the circumference of the riser and immediately above the closed riser sealing element.

4. The arrangement of claim 1, wherein the distribution line is a ring line encircling the riser.

5. The arrangement of claim 1, wherein the plurality of fluid flushing inlets are set at an acute angle relative to the longitudinal axis of the riser.

6. The arrangement of claim 1, further comprising a debris agitating device in the form of a fluid directing element shaped to direct particles towards the periphery of the riser.

7. The arrangement of claim 6, wherein the fluid directing element is conical.

8. The arrangement according to claim 1, wherein the debris comprises cuttings.

9. The arrangement of claim 1, wherein the external line is a boost line.

10. An arrangement for preventing collection of debris on or for removing debris from the top of a closed riser sealing device in a subsea riser, comprising a swirl element located immediately above the riser sealing device, the swirl element being rotationally coupled to a drill string but being allowed to slide axially with respect to the drill string.

11. The arrangement of claim 10, wherein the swirl element is equipped with an elastic material part providing friction against the drill string and the elastic material part having a sufficient flexibility to let varying diameters of a drill pipe pass through.

12. The arrangement according to claim 10, wherein the swirl element has a weight that holds the swirl element against the riser sealing element, or that is mechanically attached to the riser sealing element in a way that allows the swirl element to rotate.

13. The arrangement of claim 10, wherein the swirl element is attached to a fluid directing element.

14. The arrangement of claim 10, wherein the swirl element comprises at least one fin.

15. A method for preventing collection of debris on or for removing debris from the top of a closed closing element in a subsea riser, wherein the debris is agitated by a jet of fluid being injected into a space in the riser immediately above the closing element, to stir up any debris from the top of the closing element, wherein the fluid to produce the jet is injected through a flushing line that branches off from an external line extending along the riser, wherein the agitation is assisted by a swirl element rotationally coupled to a drill string.

16. The method of claim 15, wherein the jet is directed at an acute angle relative to the circumference of the riser.

17. The method of claim 15, wherein a jet is injected into the riser at multiple locations along the circumference of the riser.

18. The method of claim 15, wherein the external line is a boost line.

* * * * *